United States Patent [19]

Kamel

[11] Patent Number: 5,386,698

[45] Date of Patent: Feb. 7, 1995

[54] CONTROL SYSTEM AND METHOD FOR GOVERNING TURBOCHARGED INTERNAL COMBUSTION ENGINES

[75] Inventor: Mostafa M. Kamel, Columbus, Ind.

[73] Assignee: Cummins Engine Company, Inc., Columbus, Ind.

[21] Appl. No.: 166,204

[22] Filed: Dec. 13, 1993

[51] Int. Cl.$^6$ ............................................. F02D 23/00
[52] U.S. Cl. ........................................ 60/603; 60/611; 123/564
[58] Field of Search ................... 123/564; 60/603, 611

[56] References Cited

U.S. PATENT DOCUMENTS

| | | |
|---|---|---|
| 4,044,560 | 8/1977 | Dorsch et al. ........................ 60/603 |
| 4,633,670 | 1/1987 | Iwasa ................................... 60/603 |
| 4,685,435 | 8/1987 | Denz et al. . |
| 4,769,995 | 9/1988 | Serve et al. . |
| 4,873,961 | 10/1989 | Tanaka . |
| 5,019,989 | 5/1991 | Ueda et al. . |
| 5,036,663 | 8/1991 | Akagi et al. . |
| 5,036,669 | 8/1991 | Earleson et al. . |
| 5,044,162 | 9/1991 | Kinoshita et al. . |
| 5,090,202 | 2/1992 | Hitomi et al. . |
| 5,094,198 | 3/1992 | Trotta . |
| 5,154,058 | 10/1992 | Mizuno . |

*Primary Examiner*—Richard A. Bertsch
*Assistant Examiner*—Charles G. Freay
*Attorney, Agent, or Firm*—James M. Durlacher

[57] ABSTRACT

A control system and method for governing turbocharged internal combustion engines is disclosed including an electronic control unit, a fuel flow control valve, an engine speed sensor, and a bypass valve to control exhaust gas flow through an exhaust bypass conduit. When engine speed is above a first predetermined engine speed, the electronic control unit controls the bypass valve to regulate exhaust gas flow through the bypass conduit, thereby limiting exhaust gas flow through the turbocharger. When the engine speed reaches a second, predetermined engine speed value that is higher than the first predetermined engine speed value, the electronic control unit completely opens the bypass valve allowing virtually total bypass of the turbocharger, and limits fuel flow to the engine by controlling the fuel flow control valve.

19 Claims, 4 Drawing Sheets

CONTROL SYSTEM AND METHOD FOR GOVERNING TURBOCHARGED INTERNAL COMBUSTION ENGINES

BACKGROUND OF THE INVENTION

This invention relates in general to a control system for an internal combustion engine with turbocharger, and more specifically to a governing system to limit engine speed and output torque in response to certain operating conditions.

In the field of internal combustion engines, the self-limiting characteristics of the unsupercharged or normally aspirated petrol engine will usually prevent excessive engine speed. In most cases, the self-limiting characteristics establish a balance between the torque required to overcome friction and windage losses and the torque developed in the unloaded engine at full throttle at a speed sufficiently low to prevent self-destruction. However, in applications where an air supercharging device is used to increase engine output a maximum engine speed limiting device becomes a virtual necessity. Typically, a governor is the device used to control the maximum engine speed.

A governor can be a mechanical or electromechanical device for automatically controlling the speed of an engine by regulating the intake of fuel. The governor limits the amount of fuel delivered to the engine once a predetermined engine speed is reached. When an engine is operated close to the governor engine speed setting, the engine speed oscillates above and below the governor setting due to delays in engine response to the reduction in fuel. Oscillation around the governor engine speed setting is an undesirable operating condition known as "hunting".

The simplest method of achieving stability in the system and eliminating hunting is to add a control system that will provide speed droop in the governor. Speed droop is a sharp decrease in engine output torque above the governor set point. The sharp decrease in output torque caused by the speed droop of the governor acts to provide stability at the governor set point.

Speed droop in a simple mechanical governor can be provided by a mechanical interconnection between servo movement and governor speed setting such that, as fuel is increased, the speed setting is decreased. The servo is positioned in response to movement of the throttle. Such a device may consist simply of a lever of suitable ratio between servo and speeder spring. The equilibrium relationship between speed setting and servo position for such a system may be represented by a line sloping or "drooping" downward to indicate a lower speed setting with movement of the servo toward the higher fuel delivery position.

While the governing systems placed on internal combustion engines provide overspeed protection and the desired droop curve, there is the added cost and expense of installing a separate governor. This extra expense is sometimes prohibitive, especially on economy class model vehicles. Further, engines with separate governing systems require additional maintenance, resulting in increased costs.

It would be desirable to provide a governing system which uses components of existing engine control systems. The use of existing components will reduce the cost of governing systems and reduce maintenance costs for the engine.

SUMMARY OF THE INVENTION

An apparatus, according to one aspect of the present invention, for governing an internal combustion engine having a turbocharger with an exhaust inlet and an exhaust outlet, the apparatus comprises an engine speed monitoring means for monitoring rotational speed of the engine, the engine speed monitoring means producing an engine speed signal corresponding to the rotational speed of the engine, an exhaust bypass conduit with a first end and a second end, the first end connected to the exhaust inlet of the turbocharger and the second end connected to the exhaust outlet of the turbocharger, a flow control means, including a control input, situated within the exhaust bypass conduit for controlling exhaust gas flow through the exhaust gas conduit, the flow control means controlling exhaust gas flow through the exhaust gas conduit in accordance with signals supplied at the input of the flow control means, a fuel control means having a control input, for controlling fuel flow to the engine, the fuel control means controlling fuel flow to the engine in accordance with signals supplied at the input of the fuel control means, first circuit means responsive to the engine speed signal, the first circuit means supplying a first control signal to the input of the flow control means to cause the flow control means to increase flow through the exhaust gas bypass conduit when the engine speed signal is above a first predetermined RPM limit, and second circuit means responsive to the engine speed signal, the second circuit means supplying a second control signal to the input of the fuel control means to cause the fuel control means to reduce fuel to the engine when the engine speed signal is above a second predetermined RPM limit, wherein the second predetermined cranking limit is higher than the first predetermined cranking limit.

A method for governing an internal combustion engine having a turbocharger, according to another aspect of the present invention, comprises the steps of monitoring the speed of the engine, limiting exhaust gas flow through the turbocharger in response to an engine speed above a first predetermined engine RPM limit, and limiting fuel flow into the engine in response to an engine speed above a second predetermined engine RPM limit, wherein the second predetermined RPM limit is higher than the first predetermined RPM limit.

It is therefore an object of the present invention to provide a governing system for an internal combustion engine with a turbocharging device that can provide the proper reduction (droop) in engine output torque above a predetermined engine speed, using existing engine components.

It is another object of the present invention to provide a control system for an engine with a turbocharger that provides an economical alternative to the installation of independent electronic governing systems.

Related objects and advantages of the present invention will become more apparent from the following description of the preferred embodiment.

DESCRIPTION OF THE PREFERRED EMBODIMENT

Figure 1:
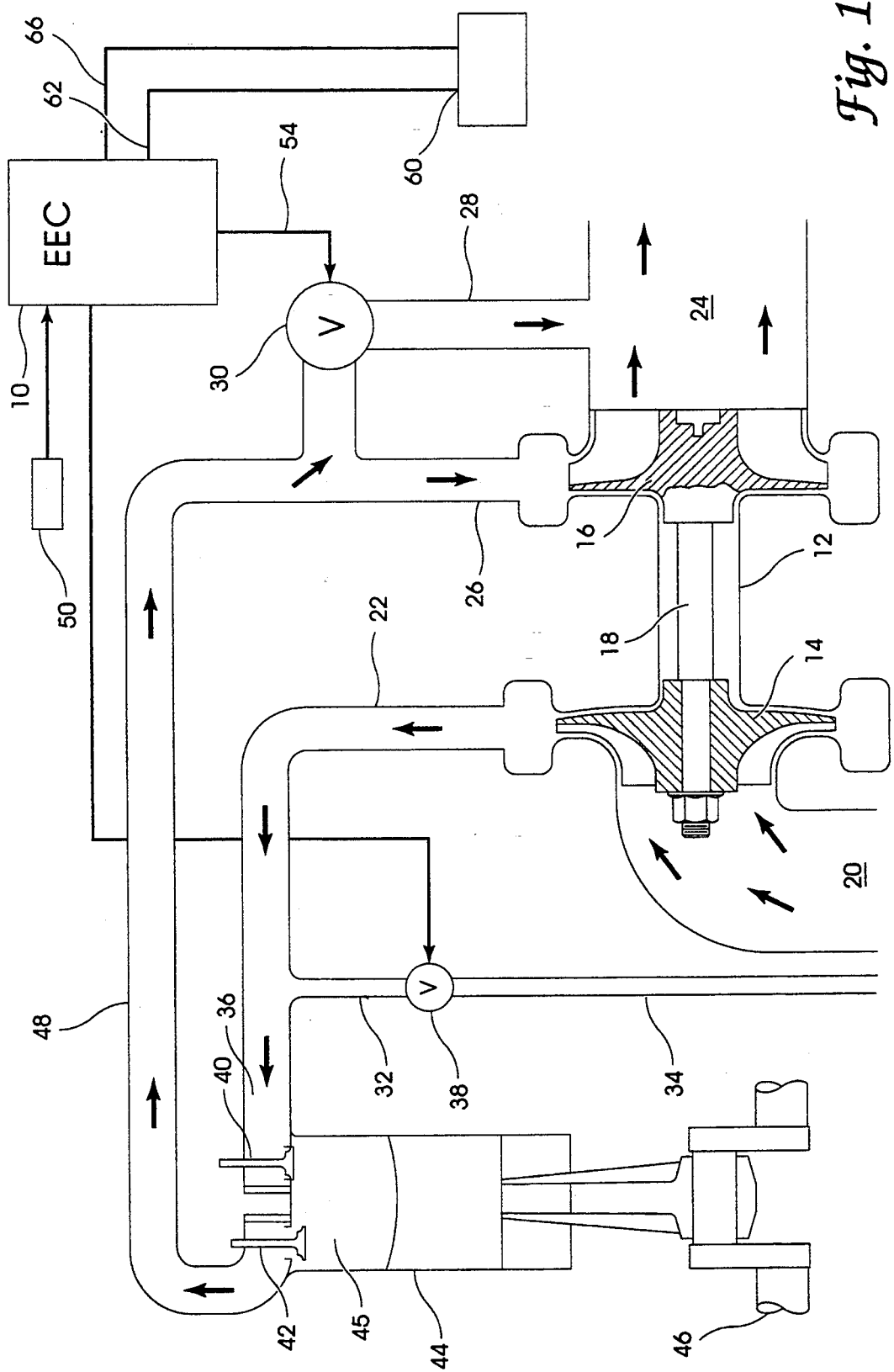
FIG. 1 is a diagrammatic illustration of an engine with a turbocharger and corresponding engine control system in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
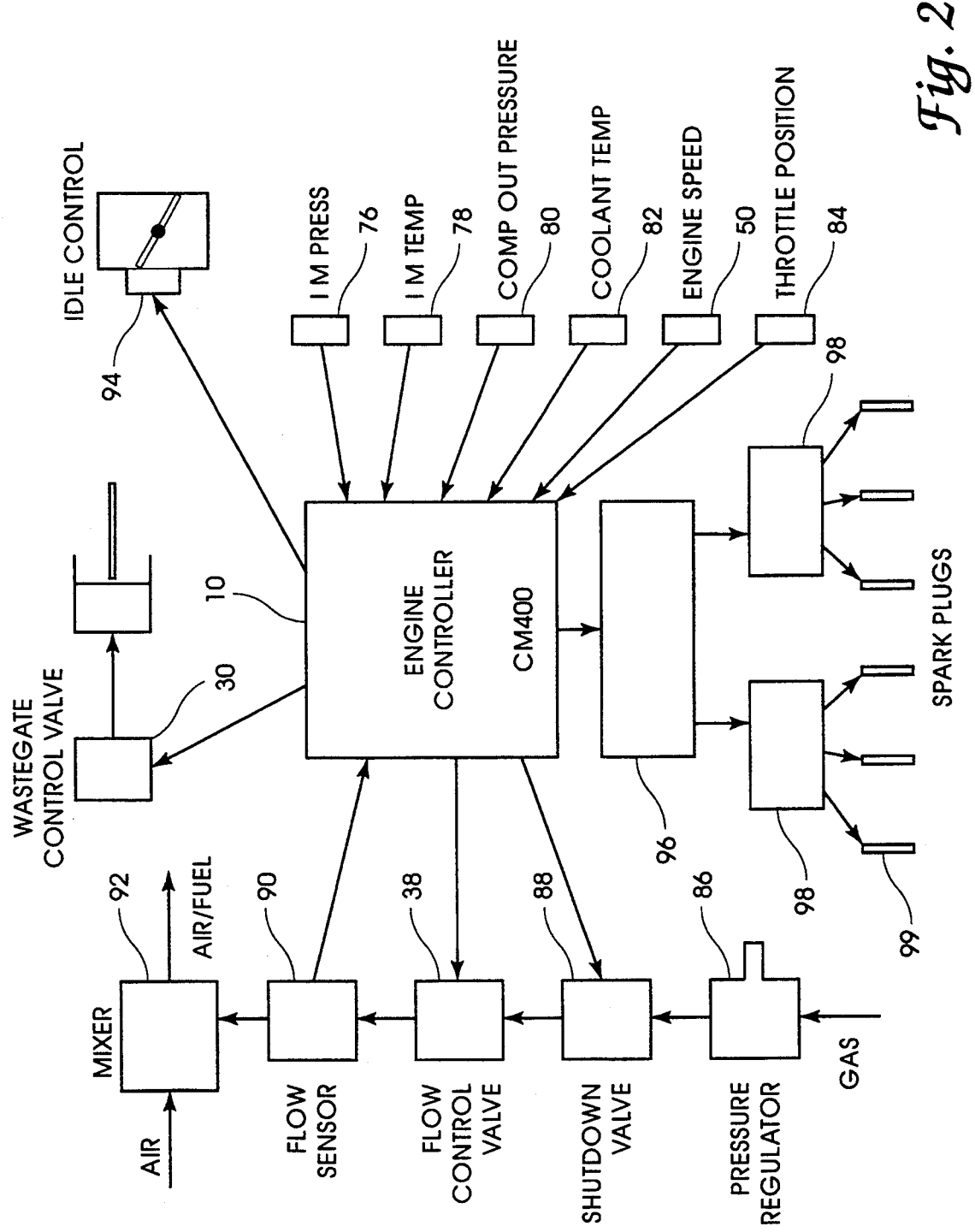
FIG. 2 is a block diagram of the electronic control unit of FIG. 1.

Referring now to FIG. 1, a diagrammatic illustration of a microprocessor controlled governing system for a turbocharged internal combustion engine in accordance with the preferred embodiment of the present invention. In the preferred embodiment, the governing system includes an electronic control unit 10. The electronic control unit 10 includes a microprocessor (not shown) including a program ROM, RAM, and analog I/O and digital I/O. The electronic control unit 10 is connected to a power source 60 by signal paths 62 and 66. The control unit 10 receives sensory input signals from a variety of engine sensors, as shown in FIG. 2, and produces output control signals that control several engine operating functions.

The internal combustion engine of the preferred embodiment is a spark ignited engine fueled by natural gas. The natural gas fuel is delivered from a fuel supply tank (not shown) through a fuel supply line 34. Fuel flow is regulated by fuel control valve 38. The fuel control valve 38 has electronic controls and receives flow control signals from the electronic control unit 10. The fuel control valve 38 regulates the amount of fuel supplied to the fuel manifold 32 in response to the flow control signals produced by electronic control unit 10.

Turbocharger 12 is mechanically actuated by the flow of exhaust gases. Exhaust gases enter through the turbocharger exhaust gas inlet 26 and strike the turbine fan 16. The exhaust gases exit the turbocharger through the turbocharger exhaust gas outlet 24. The rotational forces created by the exhaust gas flowing through turbine fan 16 are transferred via turbine drive shaft 18 to the turbocharger compressor wheel 14. The turbocharger compressor wheel 14 compresses the air from the fresh air inlet 20 and delivers the compressed air to the air manifold 22.

The compressed air of the air manifold 22 is mixed with fuel supplied via fuel manifold 32. The mixture moves through the intake manifold 36 to the combustion chamber 44. The air-fuel mixture is delivered to the combustion chamber 45 through intake port 40. The air-fuel mixture is then compressed and spark ignited. For illustration purposes only one combustion chamber is shown in FIG. 1. However, is apparent to those skilled in the art, the engine may have a plurality of such combustion chambers.

After the combustion cycle, the exhaust gases are expelled through exhaust port 42 and enter the exhaust gas manifold 48. The exhaust gas manifold 48 is connected to the turbocharger exhaust gas inlet 26, such that exhaust gases may flow through the turbocharger fan 16. An exhaust bypass conduit 28 connects the turbocharger exhaust gas inlet 26 to the turbocharger exhaust gas outlet 24. The exhaust gas bypass conduit 28 serves to route part or all of the engine exhaust gas around the turbocharger 12, thereby controlling or limiting the air pressure in the intake manifold 36 and, subsequently, the air mass in the combustion chamber 44.

An exhaust gas bypass valve 30 is located within the exhaust bypass conduit 28. The valve 30 iis known in the art as a wastegate valve. The bypass valve 30 is actuated in such a fashion as to regulate the exhaust gas flow through the exhaust gas conduit, thereby controlling the exhaust gas flow through the turbocharger. The bypass valve 30 is actuated via pneumatic pressure. The pneumatic pressure in the valve assembly is controlled by electronic control unit 10, which transmits signals to the bypass valve assembly via signal path 54.

During normal operation, the position of the bypass valve 30 is calculated by the electronic control unit 10 to regulate exhaust flow through the turbocharger. The position is calculated to optimize the air manifold pressure and subsequent air mass in the combustion chamber for maximum engine output.

One object of the present invention is to limit the engine speed when engine operation is outside of normal operating conditions and to create a sharp decrease in engine output torque above a predetermined governor set point. A sharp decrease in engine output torque above the governor set point minimizes speed "hunting" around the governor set point. In the preferred embodiment of the present invention, the electronic control unit 10, which is used to control a variety of engine parameters, is pre-programmed with two predetermined engine speed values. The first value is the rated engine speed, while the second value is midway between the rated engine speed and a maximum engine speed.

Electronic control unit 10 receives engine speed signals from speed sensing device 50. When the engine speed reaches a first predetermined engine speed value, electronic control unit 10 will calculate a desired position for the bypass valve 30 necessary to achieve a specified "droop" in engine output torque. The electronic control unit 10 supplies a control signal to bypass valve 30 to control the position of the bypass valve. As valve 30 reduces exhaust gas flow through conduit 26, air flow will be reduced in conduit 22 and engine power and torque are reduced accordingly. As the engine speed increases above the first predetermined value, the electronic control unit 10 supplies signals to the bypass valve 30 controlling it to open further and allow more exhaust gas to bypass the turbocharger. Once the engine speed has reached the second predetermined engine speed value, the bypass valve 30 will be controlled to its fully open position, enabling maximum exhaust gas bypass around the turbocharger.

At or above the second predetermined engine speed value, the electronic control unit will calculate an appropriate position for fuel control valve 38 to create the desired droop in engine output torque. A signal from electronic control unit 10 is supplied to fuel control valve 38 to limit fuel to the engine. The electronic control unit 10 will continue to reduce fuel supplied to the engine until the engine speed reaches a maximum engine speed, at which point the electronic control unit will control the fuel control valve to an almost completely closed position, whereby fuel flow to the engine will be substantially cut-off.

Referring now to FIG. 2, a block diagram of the electronic control unit 10 is shown. The engine control unit receives a number of inputs from various engine sensors. These include the intake manifold pressure sensor 76, intake manifold temperature sensor 78, turbocharger compressor output pressure sensor 80, coolant temperature sensor 82, throttle position sensor 84, fuel flow sensor 90, and engine speed sensor 50. Electronic control unit 10 produces various signals to control the operation of the engine. Devices receiving control signals include the idle control device 94, fuel shutdown valve 88, fuel flow control valve 38, bypass (wastegate) valve 30 and the control module 96 which provides signals to the coil packs 98. Coil packs 98 provide signals to the spark plugs 99. Gas pressure regulator 86 and air/fuel mixer 92 are not directly controlled by the electronic control unit 10.

The present invention is primarily concerned with controlling the bypass valve 30 and fuel control valve 38. The electronic control unit 10 is programmed to control the bypass valve 30 and fuel control valve 38 in such a manner as to reduce the engine output torque above the rated engine speed to create a droop curve similar to that produced by a governed diesel engine.

Figure 3:
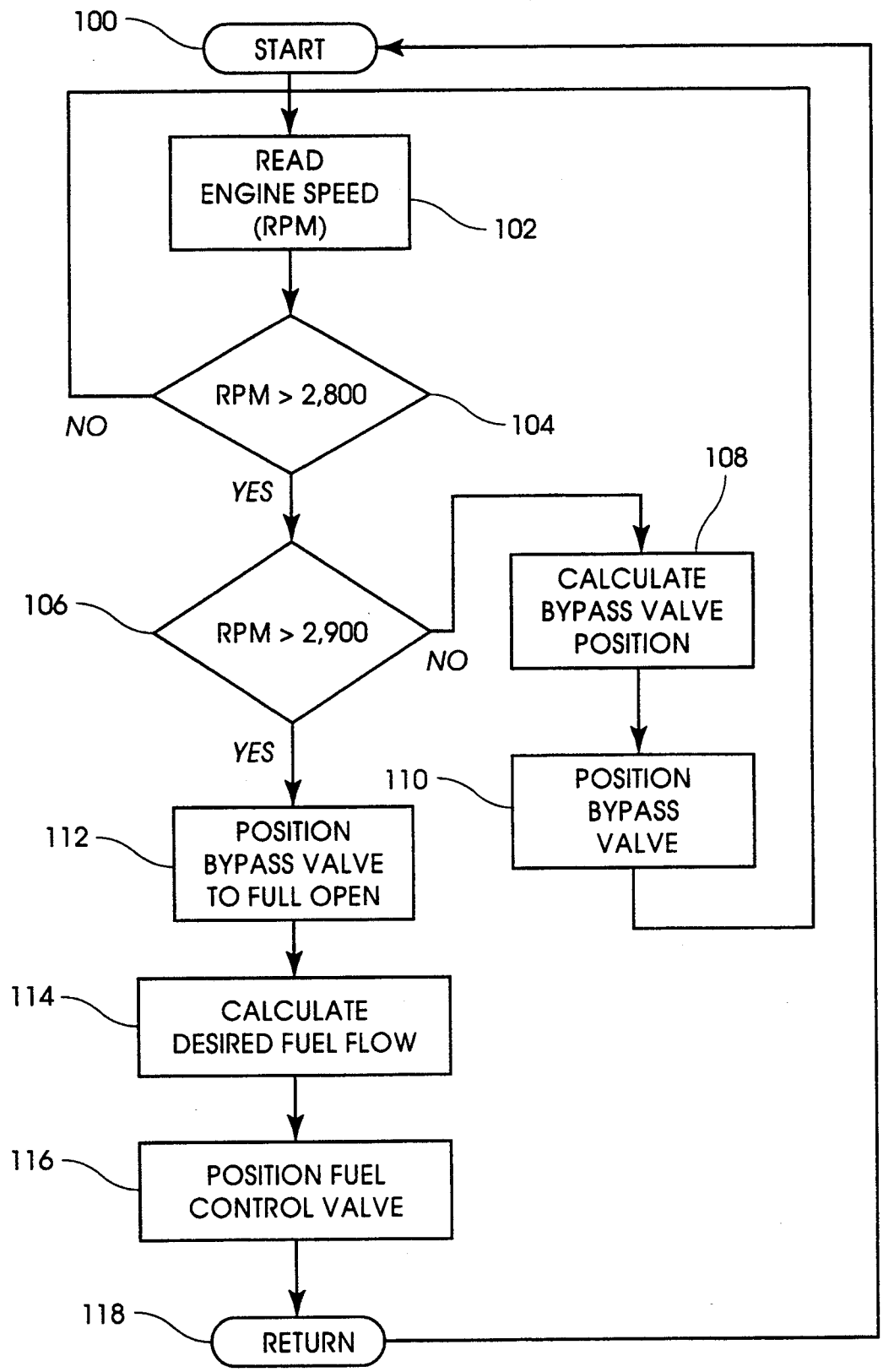
FIG. 3 is a flowchart of the engine speed subroutine executed by the electronic control unit of FIG. 2.

Referring now to FIG. 3, a flowchart of an engine speed control subroutine executed by the electronic control unit 10 is shown. This routine is executed many times each second during normal engine operation. Upon receiving a power signal, the electronic control unit 10 is initialized at step 100. At step 102, the electronic control unit inputs the engine speed signal from speed sensor 50. At step 104, the electronic control unit compares the engine speed of step 102 to the first predetermined value, 2800 RPM. If the engine speed is less than 2800 RPM then the execution returns to step 102 to read the engine speed again.

If the engine speed is above 2800 RPM at step 104, then step 106 is executed and the engine speed is compared to the second predetermined value, 2900 RPM. If the engine speed is less than 2900 RPM at step 106, then step 108 is executed thereafter and the desired position of the bypass valve 30 is determined. Next at step 110 the electronic control unit sends a control signal to bypass valve 30 to position the valve in accordance with the valve position determined at step 108. Program execution continues at step 102 after step 110.

If the engine speed is greater than 2900 RPM at step 106, then program execution continues at step 112 and the bypass valve 30 is sent a control signal to position the valve to its fully open position. Next, at step 114, electronic control unit 10 calculates the desired position of the fuel control valve 38. The position of the fuel control valve is calculated to limit fuel to the engine to create a reduction in engine output torque. After step 118, program flow returns to step 102 to read the engine speed.

Figure 4:
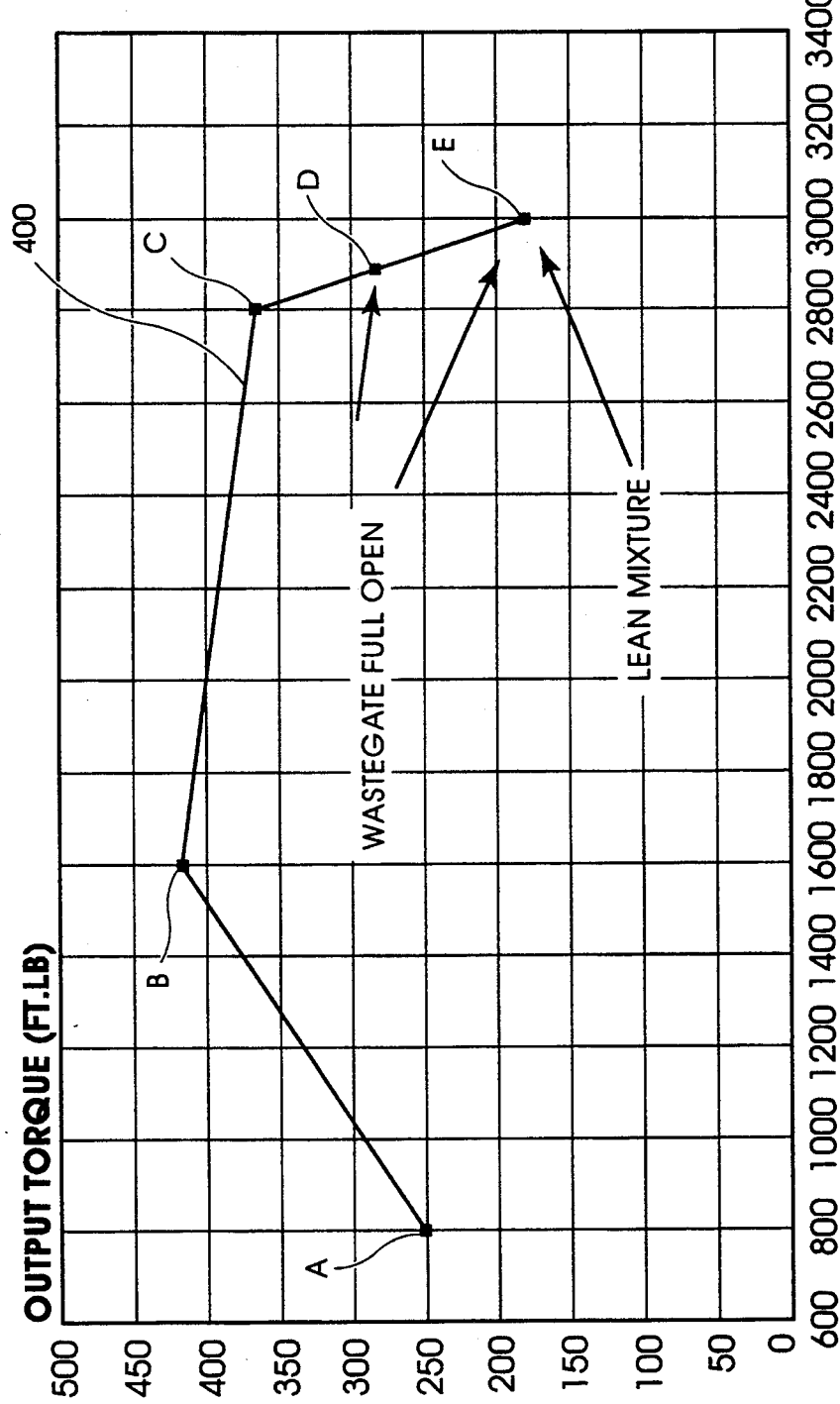
FIG. 4 is a graph showing the engine output torque curve versus engine speed including the first and second predetermined engine speed values.

Referring now to FIG. 4, a graphical illustration showing the engine output torque curve 400 versus engine speed. Idle speed and associated output torque are shown at point A. The curve 400 increases to a maximum output torque at point B, then steadily decreases to point C, the rated engine speed. The first predetermined valve is the rated engine speed, 2800 RPM, point C on curve 400. The second predetermined value is 2900 RPM, point D on the curve 400. Once the engine reaches 2800 RPM, point C, the electronic engine control unit begins to modulate the bypass valve 30, thereby decreasing turbocharger action. The electronic control unit 10 modulates the bypass valve from point C, 2800 RPM, to point D, 2900 RPM, thereby reducing the output torque from approximately 360 Ft.Lb. to approximately 280 Ft.Lb. At point D, 2900 RPM, the electronic control unit 10 controls the bypass valve to a full open position, allowing virtually total bypass of exhaust gases around the turbocharger turbine fan. Electronic control unit 10 begins modulating the fuel control valve 38 once the engine speed is above 2900 RPM. The fuel valve is modulated to continue reduction of the output torque from approximately 280 Ft.Lb. to approximately 180 Ft.Lb. The modulation of the fuel control valve continues until the engine speed reaches a maximum engine speed at point E, 3000 RPM, at which point the fuel flow control valve is positioned to allow the minimum fuel flow to the engine, almost completely shutting off the fuel supply to the engine.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for governing an internal combustion engine having a turbocharger, comprising the steps of;
   monitoring the speed of said engine;
   limiting exhaust gas flow through the turbocharger in response to an engine speed above a pre-programmed first predetermined engine RPM limit; and
   restricting fuel flow into the engine in response to an engine speed above a pre-programmed second predetermined engine RPM limit until the engine reaches a pre-programmed third predetermined engine RPM limit, wherein said second predetermined RPM limit is higher than said first predetermined RPM limit.

2. The method of claim 1, wherein the exhaust gas flow through the turbocharger and the fuel flow to the engine are controlled to produce a droop in output torque above said first predetermined engine RPM limit.

3. The method of claim 2, wherein the first predetermined engine RPM limit is the rated engine speed and the third predetermined engine RPM limit is the maximum engine speed.

4. The method of claim 1, wherein the fuel is natural gas.

5. The method of claim 1, wherein the turbocharger has an exhaust gas inlet and an exhaust gas outlet, a conduit connecting said exhaust gas inlet and outlet, and a valve positioned in said conduit, and wherein said valve is operated to limit exhaust gas supplied to the turbocharger.

6. The method of claim 5, further including the step of controlling said valve to full open when the engine RPM is above the second predetermined engine RPM limit.

7. The method of claim 1 which additionally includes the step of shutting off the fuel flow almost completely to the engine in response to an engine speed above the third predetermined engine RPM limit, wherein the third predetermined engine RPM limit is higher than the second predetermined engine RPM limit.

8. The method of claim 1 which additionally includes the step of substantially reducing to a minimum the fuel flow to the engine in response to an engine speed above the third predetermined engine RPM limit, wherein the third predetermined engine RPM limit is higher than the second predetermined engine RPM limit.

9. An apparatus for governing an internal combustion engine having a turbocharger with an exhaust inlet and an exhaust outlet, said apparatus comprising;
    engine speed monitoring means for monitoring rotational speed of the engine, said engine speed monitoring means further for producing an engine speed signal corresponding to the rotational speed of the engine;
    an exhaust bypass conduit with a first end and a second end, said first end connected to the exhaust inlet of the turbocharger and said second end connected to the exhaust outlet of the turbocharger;
    flow control means situated within said exhaust bypass conduit for regulating exhaust gas flow through said exhaust bypass conduit, said flow control means regulating exhaust gas flow through said exhaust bypass conduit in response to signals supplied at a control input of said flow control means;
    fuel control means having a control input, for regulating fuel flow to the engine, said fuel control means regulating fuel flow to the engine in response to signals supplied at said control input of said fuel control means;
    circuit means responsive to said engine speed signal, said circuit means further for supplying a first control signal to said input of said flow control means to cause said flow control means to increase flow through said exhaust bypass conduit when said engine speed signal is above a pre-programmed first predetermined RPM limit;
    said circuit means further for supplying a second control signal to said input of said fuel control means to cause said fuel control means to reduce fuel to the engine when said engine speed signal is above a pre-programmed second predetermined RPM limit, wherein said second predetermined RPM limit is higher than said first predetermined RPM limit; and
    said circuit means further for supplying a third control signal to said input of said fuel control means to cause said fuel control means to substantially reduce fuel flow to the engine when said engine speed signal is above a pre-programmed third predetermined RPM limit, wherein said third predetermined RPM limit is higher than said second predetermined RPM limit.

10. The apparatus of claim 9, wherein said flow control means consists of an exhaust bypass valve and said fuel control means consists of a fuel control valve.

11. The apparatus of claim 10, wherein said exhaust bypass valve and said fuel control valve are controlled to produce an engine output torque droop when said engine speed signal is above the first predetermined engine RPM limit.

12. The apparatus of claim 11, wherein the exhaust bypass valve is completely open when said engine speed signal is above the second predetermined engine RPM.

13. The apparatus of claim 9, wherein the first predetermined engine speed value is the rated engine speed and the third predetermined RPM limit is the maximum engine speed.

14. The apparatus of claim 9, wherein the fuel is natural gas.

15. An apparatus for governing an internal combustion engine having a turbocharger with an exhaust inlet and an exhaust outlet, a battery and a corresponding charging system, said apparatus comprising;
    engine speed monitoring means for monitoring rotational speed of the engine, said engine speed monitoring means further for producing an engine speed signal corresponding to the rotational speed of the engine;
    exhaust bypass conduit with a first end and a second end, said first end connected to the exhaust inlet of the turbocharger and said second end connected to the exhaust outlet of the turbocharger;
    flow control means situated within said exhaust bypass conduit for regulating exhaust gas flow through said exhaust bypass conduit, said flow control means regulating exhaust gas flow through said exhaust bypass conduit in response to signals supplied at a control input of said flow control means;
    a fuel control means having a control input for controlling fuel flow to the engine in response to signals supplied at said input of said fuel control means; and
    electronic control means for controlling system functions, said electronic control means responsive to said engine speed signal, and wherein,
        said electronic control means operates in a first mode of operation by supplying a first control signal to said input of said flow control means to cause said flow control means to increase exhaust gas flow through said exhaust bypass conduit when said engine signal is above a pre-programmed first predetermined RPM limit,
        said electronic control means operates in a second mode of operation by supplying a second control signal to said input of said fuel control means to cause said fuel control means to reduce fuel supplied to the engine when said engine signal is above a pre-programmed second predetermined RPM limit, wherein said second predetermined RPM limit is higher than said first predetermined RPM limit, and
        said electronic control means operates in
    a third mode of operation by supplying a third control signal to said input of said fuel control means to cause said fuel control means to substantially reduce fuel flow to the engine when said engine signal is above a pre-programmed third predetermined RPM limit, wherein said third predetermined RPM limit is higher than said second predetermined RPM limit.

16. The apparatus of claim 15, wherein the flow control means consists of an exhaust bypass valve and an exhaust valve actuator mechanically connected to said exhaust bypass valve and said fuel control means consists of a fuel control valve and a fuel valve actuator mechanically connected to said fuel control valve.

17. The apparatus of claim 16, wherein said flow control means is completely open when the engine speed signal is above the second predetermined engine RPM.

18. The apparatus of claim 17 wherein the first predetermined RPM value is the rated engine speed and the third predetermined RPM value is the maximum engine speed.

19. The apparatus of claim 18, wherein the fuel is natural gas.

* * * * *